(12) United States Patent
Gao et al.

(10) Patent No.: US 11,763,204 B2
(45) Date of Patent: Sep. 19, 2023

(54) METHOD AND APPARATUS FOR TRAINING ITEM CODING MODEL

(71) Applicants: Beijing Bytedance Network Technology Co., Ltd., Beijing (CN); ByteDance Inc., Los Angeles, CA (US)

(72) Inventors: Weihao Gao, Beijing (CN); Xiangjun Fan, Los Angeles, CA (US); Jiankai Sun, Los Angeles (CN); Wenzhi Xiao, Beijing (CN); Chong Wang, Los Angeles, CA (US); Xiaobing Liu, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/877,635

(22) Filed: Jul. 29, 2022

(65) Prior Publication Data

US 2022/0366312 A1 Nov. 17, 2022

Related U.S. Application Data

(63) Continuation of application No. PCT/CN2021/102486, filed on Jun. 25, 2021.

(30) Foreign Application Priority Data

Jun. 30, 2020 (CN) .......................... 202010613628.4

(51) Int. Cl.
*G06N 20/00* (2019.01)
(52) U.S. Cl.
CPC .................................. *G06N 20/00* (2019.01)

(58) Field of Classification Search
None
See application file for complete search history.

(56) References Cited

U.S. PATENT DOCUMENTS 8,407,226 B1    3/2013  Das et al.
2015/0269337 A1  9/2015  Schulte et al.

FOREIGN PATENT DOCUMENTS

CN    105956093 A    9/2016
CN    107562787 A    1/2018
(Continued)

OTHER PUBLICATIONS

Khawar F, Poon L, Zhang NL. Learning the structure of auto-encoding recommenders. In Proceedings of The Web Conference 2020. Apr. 20, 2020, pp. 519-529.) (Year: 2020).*

(Continued)

*Primary Examiner* — Vincent Gonzales
(74) *Attorney, Agent, or Firm* — ARENTFOX SCHIFF LLP

(57) ABSTRACT

Disclosed in the embodiments of the present invention are a method and an apparatus for training an item coding model. The method comprises: acquiring an initial item coding model and a training sample set; using sample user information of training samples in the training sample set as the input for the initial item coding model to obtain the probability of sample item coding information corresponding to the inputted sample user information; adjusting the structural parameters of the initial item coding model to train an item coding model, the item coding model being used for characterizing the correspondence between inputted sample user information and sample item coding information and the correspondence between sample item information and sample item coding information. The present embodiment can use the trained item coding model to implement item (Continued)

recommendation and can use the item coding information as an index to increase retrieval efficiency.

16 Claims, 6 Drawing Sheets

(56) References Cited

FOREIGN PATENT DOCUMENTS

| | | |
|---|---|---|
| CN | 108630190 A | 10/2018 |
| CN | 109522486 A | 3/2019 |
| CN | 110188449 A | 8/2019 |
| CN | 110458638 A | 11/2019 |
| CN | 110555168 A | 12/2019 |
| CN | 111225009 A | 6/2020 |
| CN | 111767953 A | 10/2020 |

OTHER PUBLICATIONS

Michanan J, Dewri R, Rutherford MJ. Predicting data structures for energy efficient computing. In 2015 Sixth International Green and Sustainable Computing Conference (IGSC) Dec. 14, 2015, pp. 1-8. IEEE. (Year: 2015).*

International Search Report issued in International Patent Application No. PCT/CN2021/102486 dated Sep. 15, 2021.

Chinese First Office Action issued in Chinese Patent Application No. 202010613628.4 dated Aug. 20, 2021.

* cited by examiner

METHOD AND APPARATUS FOR TRAINING ITEM CODING MODEL

CROSS REFERENCE TO RELATED APPLICATIONS

The present application is a continuation of PCT application Ser. No. PCT/CN2021/102486, titled "METHOD AND APPARATUS FOR TRAINING ITEM CODING MODEL", filed on Jun. 25, 2021, which claims priority to Chinese Patent Application No. 202010613628.4, filed on Jun. 30, 2020 and entitled "METHOD AND APPARATUS FOR TRAINING ITEM CODING MODEL", the entire contents of both of which are incorporated herein by reference.

FIELD

Embodiments of the present application relate to the technical field of computers, in particular to a method and apparatus for training an item coding model.

BACKGROUND

With the development of Internet technologies, various search systems have also been used more and more widely. In a search technology, the quality of recall information often has an important impact on ranking results of recommendation systems.

Existing recall models mainly include point multiplication models of a "double tower structure" based on an FBT (Full Binary Tree) algorithm, and an HNSW (Hierarchical Navigable Small World graphs) algorithm, and deep tree structure models based on a TDM (Tree-based Deep Match) algorithm and a JTM (Joint Optimization of Tree-based Index and Deep Model) algorithm.

SUMMARY

Embodiments of the present application propose a method and apparatus for training an item coding model.

In a first aspect, an embodiment of the application provides a method for training an item coding model, the method comprises: obtaining a training sample set, wherein a training sample in the training sample set comprises sample user information, sample item information corresponding to the sample user information, and sample item coding information corresponding to the corresponding sample item information; obtaining an initial item coding model; using the sample user information of the training sample in the training sample set as input into the initial item coding model to obtain a probability of the sample item coding information corresponding to the input sample user information; and adjusting a structural parameter of the initial item coding model on the basis of maximizing the obtained probability of the sample item coding information corresponding to the input sample user information, so as to obtain the item coding model by training, wherein the item coding model is used to represent a correspondence relationship between the input sample user information and the sample item coding information as well as a correspondence relationship between the sample item information and the sample item coding information.

In some embodiments, obtaining the training sample set comprises: obtaining an initial training sample set, wherein an initial training sample in the initial training sample set comprises the sample user information and the sample item information corresponding to the sample user information; randomly generating the sample item coding information corresponding to the initial training sample in the initial training sample set; and combining the initial training sample and the randomly generated sample item coding information into the training sample in the training sample set.

In some embodiments, the method further comprises: determining a relevance degree between each piece of sample item information and each piece of item coding information output by the initial item coding model in a process of adjusting the structural parameter of the initial item coding model, wherein the relevance degree is determined based on a probability of at least one piece of item coding information obtained from the input sample user information corresponding to the sample item information through the initial item coding model; and adjusting the correspondence relationship between the sample item information and the sample item coding information based on the determined relevance degree.

In some embodiments, determining the relevance degree between each piece of sample item information and each piece of item coding information output by the initial item coding model in the process of adjusting the structural parameter of the initial item coding model comprises: determining probabilities between the sample item information in each batch of training samples and the corresponding item coding information sequentially according to a time order as sub-relevance degrees; and integrating the determined sub-relevance degrees to generate the relevance degree between each piece of sample item information and each piece of item coding information, wherein a proportion of the sub-relevance degrees to the relevance degree is consistent with a proximity degree of a training moment to a current moment.

In some embodiments, adjusting the correspondence relationship between the sample item information and the sample item coding information based on the determined relevance degree comprises: adjusting the correspondence relationship between the sample item information and the sample item coding information according to a distribution consistent with the determined relevance degree and based on a preset penalty function, wherein the penalty function is in positive correlation with a number of sample items corresponding to the item coding information.

In some embodiments, the sample item information corresponds to a priority, and adjusting the correspondence relationship between the sample item information and the sample item coding information according to the distribution consistent with the determined relevance degree and based on the preset penalty function comprises: selecting, in response to determining that a number corresponding to the same piece of item coding information is larger than a preset threshold, sample item information of a target number from the sample item information corresponding to the same piece of item coding information according to the corresponding priority; and re-generating a sample item coding information corresponding to the selected sample item information of the target number according to the determined relevance degree.

In some embodiments, a coding space corresponding to the sample item coding information comprises layers of a first number, each layer in the layers of the first number comprises dimensions of a second number, and the first number is smaller than the second number.

In some embodiments, using the sample user information of the training sample in the training sample set as the input into the initial item coding model to obtain the probability of the sample item coding information corresponding to the input sample user information comprises: inputting the sample user information of the training sample in the training sample set into the initial item coding model to obtain a probability distribution of at least one piece of item coding information corresponding to the input sample user information, wherein the at least one piece of item coding information comprises the sample item coding information corresponding to the input sample user information, a probability in the probability distribution is obtained based on a sub-probability output by each layer in the coding space, and the sub-probability is obtained based on the sample user information and a feature vector output by a previous layer.

In a second aspect, an embodiment of the application provides a method for generating recalled item information, comprising: obtaining user information; inputting the user information into a pre-trained item coding model to obtain item coding information corresponding to the user information, wherein the item coding model is obtained by training through the method described in any one implementation in the first aspect; and inputting the item coding information and the user information into a pre-trained vector model to obtain the recalled item information corresponding to the user information.

In some embodiments, the item coding model and the vector model are trained together based on a feature vector corresponding to the item coding information.

In a third aspect, an embodiment of the application provides an apparatus for training an item coding model, comprising: a sample obtaining unit configured to obtain a training sample set, wherein a training sample in the training sample set comprises sample user information, sample item information corresponding to the sample user information, and sample item coding information corresponding to the corresponding sample item information; a model obtaining unit configured to obtain an initial item coding model; a generating unit configured to use the sample user information of the training sample in the training sample set as input into the initial item coding model to obtain a probability of the sample item coding information corresponding to the input sample user information; and a training unit configured to adjust a structural parameter of the initial item coding model on the basis of maximizing the obtained probability of the sample item coding information corresponding to the input sample user information, so as to obtain the item coding model by training, wherein the item coding model is used to represent a correspondence relationship between the input sample user information and the sample item coding information as well as a correspondence relationship between the sample item information and the sample item coding information.

In some embodiments, the sample obtaining unit comprises: an obtaining module configured to obtain an initial training sample set, wherein an initial training sample in the initial training sample set comprises the sample user information and the sample item information corresponding to the sample user information; a first generating module configured to randomly generate the sample item coding information corresponding to the initial training sample in the initial training sample set; and a combining module configured to combine the initial training sample and the randomly generated sample item coding information into the training sample in the training sample set.

In some embodiments, the apparatus further comprises: a determining unit configured to determine a relevance degree between each piece of sample item information and each piece of item coding information output by the initial item coding model in a process of adjusting the structural parameter of the initial item coding model, wherein the relevance degree is determined based on a probability of at least one piece of item coding information obtained from the input sample user information corresponding to the sample item information through the initial item coding model; and a adjusting unit configured to adjust the correspondence relationship between the sample item information and the sample item coding information based on the determined relevance degree.

In some embodiments, the determining unit comprises: a determining module configured to determine the relevance degree between each piece of sample item information and each piece of item coding information output by the initial item coding model in the process of adjusting the structural parameter of the initial item coding model comprises: determining probabilities between the sample item information in each batch of training samples and the corresponding item coding information sequentially according to a time order as sub-relevance degrees; and an integrating module configured to integrate the determined sub-relevance degrees to generate the relevance degree between each piece of sample item information and each piece of item coding information, wherein a proportion of the sub-relevance degrees to the relevance degree is consistent with a proximity degree of a training moment to a current moment.

In some embodiments, the adjusting unit further configured to adjust the correspondence relationship between the sample item information and the sample item coding information based on the determined relevance degree comprises: adjusting the correspondence relationship between the sample item information and the sample item coding information according to a distribution consistent with the determined relevance degree and based on a preset penalty function, wherein the penalty function is in positive correlation with a number of sample items corresponding to the item coding information.

In some embodiments, the sample item information corresponds to a priority, and the adjusting unit comprises: selecting module configured to select, in response to determining that a number corresponding to the same piece of item coding information is larger than a preset threshold, sample item information of a target number from the sample item information corresponding to the same piece of item coding information according to the corresponding priority; and re-generating sample item coding information corresponding to the selected sample item information of the target number according to the determined relevance degree.

In some embodiments, a coding space corresponding to the sample item coding information comprises layers of a first number, each layer in the layers of the first number comprises dimensions of a second number, and the first number is smaller than the second number.

In some embodiments, the generating unit further configured to use the sample user information of the training sample in the training sample set as the input into the initial item coding model to obtain the probability of the sample item coding information corresponding to the input sample user information comprises: inputting the sample user information of the training sample in the training sample set into the initial item coding model to obtain a probability distribution of at least one piece of item coding information corresponding to the input sample user information, wherein the at least one piece of item coding information comprises the sample item coding information corresponding to the input sample user information, a probability in the probability distribution is obtained based on a sub-probability output by each layer in the coding space, and the sub-probability is obtained based on the sample user information and a feature vector output by a previous layer.

In a fourth aspect, an embodiment of the application provides an apparatus for generating recalled item information, comprising: an information obtaining unit configured to obtain user information; a coding unit configured to input the user information into a pre-trained item coding model to obtain item coding information corresponding to the user information, wherein the item coding model is obtained by training through the method described in any one implementation in the first aspect; and a recall unit configured to input the item coding information and the user information into a pre-trained vector model to obtain the recalled item information corresponding to the user information.

In some embodiments, the item coding model and the vector model are trained together based on a feature vector corresponding to the item coding information.

In a fifth aspect, an embodiment of the application provides a server, comprising: one or more processors; and a storage apparatus, storing one or more programs therein; when the one or more programs are executed by the one or more processors, cause the one or more processors to implement the method described in any one implementation in the first aspect.

In a fifth aspect, an embodiment of the application provides a computer-readable storage medium, storing a computer program therein, wherein the program, when being executed by a processor, causes the processor to implement the method described in any one implementation in the first aspect.

According to the method and apparatus for training the item coding model provided by the embodiments of the present application, first, an initial item coding model and a training sample set are obtained, a training sample in the training sample set including sample user information, sample item information corresponding to the sample user information, and sample item coding information corresponding to the corresponding sample item information. Then, the sample user information of the training sample in the training sample set is used as input into the initial item coding model to obtain a probability of the sample item coding information corresponding to the input sample user information. Afterwards, a structural parameter of the initial item coding model is adjusted on the basis of maximizing the obtained probability of the sample item coding information corresponding to the input sample user information, so as to obtain the item coding model by training. The item coding model is used to represent a correspondence relationship between the input sample user information and the sample item coding information as well as a correspondence relationship between the sample item information and the sample item coding information. Therefore, item recommendation may be realized by using the trained item coding model, and the item coding information may be used as indexes to improve the retrieval efficiency.

BRIEF DESCRIPTION OF THE DRAWINGS

Other features, objectives and advantages of the present application will become more apparent by reading detailed description of non-limiting embodiments made with reference to the following drawings.

DETAILED DESCRIPTION OF THE EMBODIMENTS

Figure 1:
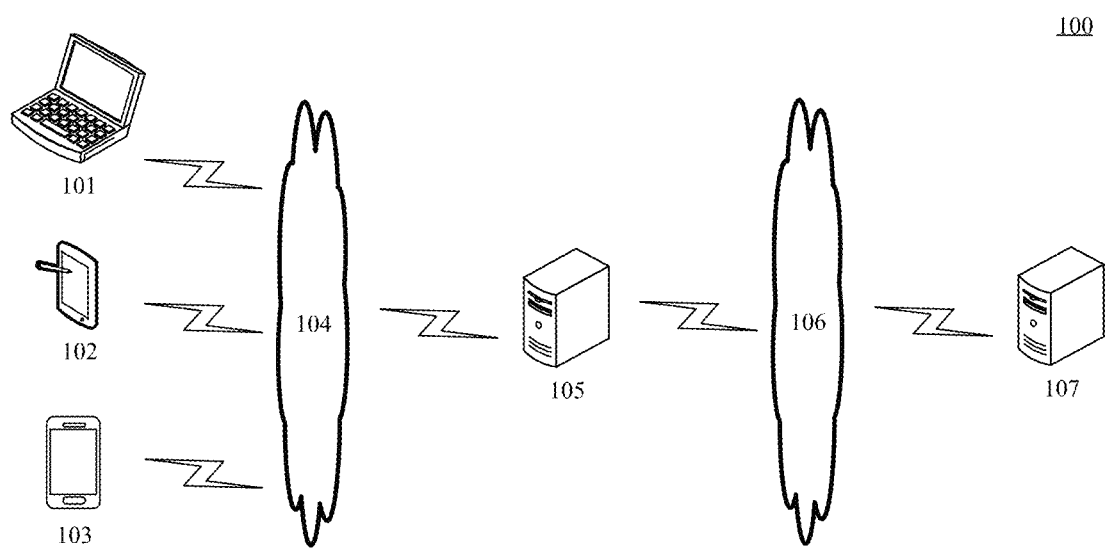
FIG. 1 is a diagram of an exemplary system architecture to which an embodiment of the present application may be applied.

The present application will be further described in detail below with reference to the accompanying drawings and embodiments. It should be understood that the specific embodiments described herein are only used to explain the related application, but not to limit the application. In addition, it should be noted that, for the convenience of description, only the parts related to the related application are shown in the drawings.

It should be noted that the embodiments in the present application and the features of the embodiments may be combined with each other in the case of no conflict. The present application will be described in detail below with reference to the accompanying drawings and in conjunction with the embodiments.

FIG. 1 shows an exemplary architecture 100 to which the method for training an item encoding model or apparatus for training an item encoding model of the present application may be applied.

As shown in FIG. 1, the system architecture 100 may include terminal devices 101, 102, 103, networks 104, 106 and servers 105, 107. The networks 104, 106 are used to provide a medium of communication links between the terminal devices 101, 102, 103 and the server 105, and between the server 105 and the server 107, respectively. The networks 104, 106 may include various connection types, such as wired, wireless communication links, or fiber optic cables, among others.

The terminal devices 101, 102, and 103 interact with the server 105 through the network 104 to receive or send messages and the like. Various communication client applications may be installed on the terminal devices 101, 102 and 103, such as web browser applications, shopping applications, search applications, instant messaging tools, email clients, social platform software, reading applications, and the like.

The terminal devices 101, 102, and 103 may be hardware or software. When the terminal devices 101, 102, and 103 are hardware, they can be various electronic devices that have a display screen and support search, including but not limited to smart phones, tablet computers, e-book readers, laptop computers and desktop computers, etc. Wait. When the terminal devices 101, 102, and 103 are software, they can be installed in the electronic devices listed above. They may be implemented as multiple software or software modules (eg, software or software modules for providing distributed services), or may be implemented as a single software or software module. There is no specific limitation here.

The server 105 may be a server that provides various services, for example, a background server that provides support for web pages displayed on the terminal devices 101, 102, and 103. Server 107 may be a server for training an item encoding model. The background server 105 can obtain the trained item encoding model from the server 107. Then the acquired item coding model is used to analyze the user information received from the terminal device, and processing results (eg articles or product information matched with the user information) are generated to feed back to the terminal device.

It should be noted that the above-mentioned server 105 can also be used to train the item coding model, so that the above-mentioned trained item coding model can also be directly stored locally on the server 105, and the server 105 can directly extract the locally stored item coding model, at this point, the network 106 and the server 107 may not exist.

It should be noted that the server may be hardware or software. When the server is hardware, it can be implemented as a distributed server cluster composed of multiple servers, or can be implemented as a single server. When the server is software, it may be implemented as multiple software or software modules (for example, software or software modules for providing distributed services), or may be implemented as a single software or software module. There is no specific limitation here.

It should be noted that the method for training the item coding model provided by the embodiments of the present application is generally executed by the server 105 or 107, and accordingly, the apparatus for training the item coding model is generally provided in the server 105 or 107.

It should be understood that the numbers of terminal devices, networks and servers in FIG. 1 are merely illustrative. There can be any number of terminal devices, networks and servers according to implementation needs.

Figure 2A:
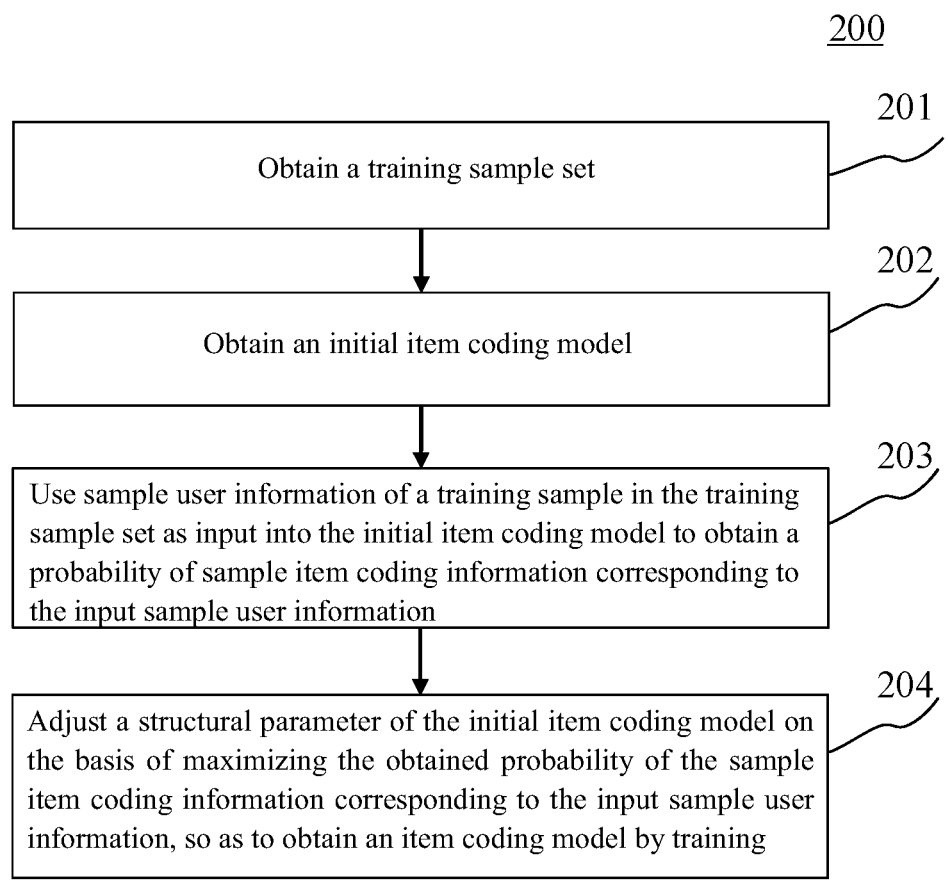
FIG. 2*a* is a flow chart of an embodiment of a method for training an item coding model according to the present application.

Further referring to FIG. 2, a flow chart 200 of an embodiment of a method for training an item coding model according to the present application is illustrated. The method for training the item coding model includes the following steps:

Step 201, a training sample set is obtained.

In the present embodiment, an execution body (for example, a server 105 shown in FIG. 1) of the method for training the item coding model may obtain the training sample set in a manner of wired connection or a manner of wireless connection. A training sample in the above training sample set may include sample user information, sample item information corresponding to the sample user information, and sample item coding information corresponding to the corresponding sample item information. The above item coding information may be used to represent a category to which an item belongs. The item coding information may include various forms, such as numbers, letters or a character string composed of them, which is not limited here.

As an example, the above sample user information may include information related to a user obtained by a recommendation system, such as a user name, a user label, etc. The above sample item information corresponding to the sample user information may, for example, include information of actual click of the user corresponding to the sample user information, and may also include information that best matches the sample user information determined according to a preset recommendation algorithm, which is not limited here. The above sample item coding information corresponding to the corresponding sample item information may be determined according to a preset coding space. For example, the coding space is 1-1000. Then, the sample item coding information corresponding to the corresponding sample item information may be any numerical value in 1-1000.

It should be noted that, a correspondence relationship between the above sample item information and the sample item coding information may be one-to-one, and may also be at least one of many-to-one or one-to-many. It can be understood that, in practical application, one item may belong to different categories viewed from different classification angles. For example, "chocolate" may belong to "foods", and may also belong to "gifts". For another example, an article on "universities" may belong to "education", and may also belong to "youth". In addition, due to limitation of the coding space and a long tail phenomenon of item classification, a manner of one piece of sample item coding information corresponding to a plurality of pieces of sample item information may increase the representation efficiency.

In some optional implementations of the embodiment, the above execution body may also obtain the training sample set through the following steps:

First step, an initial training sample set is obtained.

In these implementations, an initial training sample in the above initial training sample set may include sample user information and sample item information corresponding to the sample user information. The sample user information and the sample item information may be the same as described before.

Second step, sample item coding information corresponding to the initial training sample in the initial training sample set is generated randomly.

In these implementations, the above execution body may randomly allocate initial training samples in the initial training sample set to the coding space corresponding to the sample item coding information, so as to generate the sample item coding information corresponding to each initial training sample.

Third step, the initial training sample and the randomly generated sample item coding information are combined into the training sample in the training sample set.

Based on the above optional implementations, the above execution body may make full use of the coding space as much as possible through random allocation, so as to avoid the situation that certain sample item codes correspond to much sample item information, so the retrieval efficiency is improved in a manner of zoning the sample item coding information.

Figure 2B:
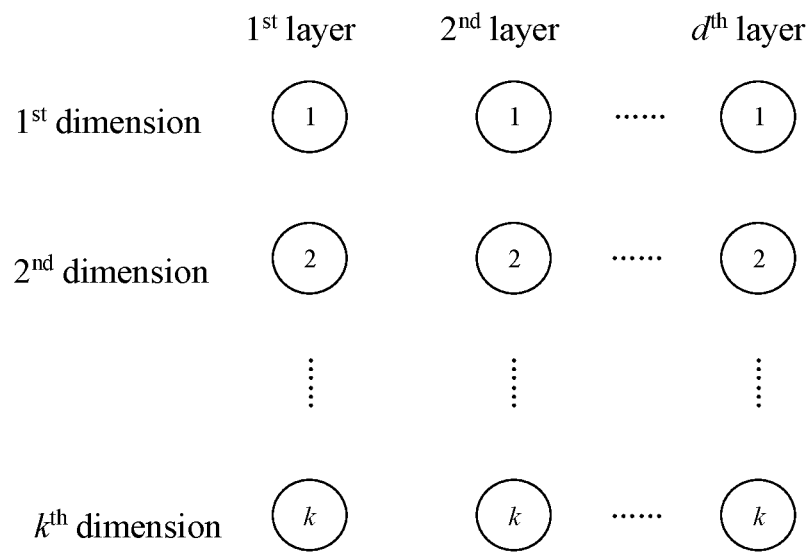
FIG. 2*b* is a schematic diagram of a coding space corresponding to sample item coding information in an embodiment of a method for training an item coding model according to the present application.

In some optional implementations of the embodiment, the coding space (as shown in FIG. 2b) corresponding to the above sample item coding information may include layers of a first number (such as d as shown in FIG. 2b). Each layer in the layers of the first number may include dimensions of a second number (such as k as shown in FIG. 2b). The above first number is normally smaller than the above second number. As an example, the first number may be 3, and the second number may be 1000. Therefore, the above coding space may include 10003 codes. The sample item coding information may, for example, be (36,27,20) or (18,27,35). The sample item coding information may be used to represent a location being arranged in the coding space, for example, the $36^{th}$ dimension of a first layer, the $27^{th}$ dimension of a second layer and the $20^{th}$ dimension of a third layer, as well as the $18^{th}$ dimension of the first layer, the $27^{th}$ dimension of the second layer and the $35^{th}$ dimension of the third layer. Specifically, the $27^{th}$ dimension of the second layer may be considered as a "shared" node of the above two pieces of sample item coding information.

Based on the above optional implementations, the item coding information is represented concretely by constructing the coding space represented by the layers and the dimensions. Moreover, compared with cluster centers in an existing clustering technology, relevance between item coding information may also be established through the "shared" nodes.

Step 202, an initial item coding model is obtained.

In the present embodiment, the above execution body may obtain the initial item coding model in a manner of wired connection or a manner of wireless connection. The above initial item coding model may include various artificial neural network (ANN) structures used for classification.

In the present embodiment, the above execution body may obtain a pre-stored initial item coding model from the local, and may also obtain the initial item coding model from an electronic device in communication connection thereto, which is not limited here.

Step 203, the sample user information of the training sample in the training sample set is used as input into the initial item coding model to obtain a probability of the sample item coding information corresponding to the input sample user information.

In the present embodiment, the above execution body may use the sample user information of the training sample in the training sample set as the input into the initial item coding model to obtain the probability of the sample item coding information corresponding to the input sample user information. Typically, the above initial item coding model may output a probability distribution of at least one piece of item coding information corresponding to the input sample user information. The above at least one piece of item coding information may typically include sample item coding information corresponding to the input sample user information. The item coding information is a category classified in a classification model. The execution body may obtain the probability of the sample item coding information corresponding to the input sample user information from the obtained at least one piece of item coding information.

In some optional implementations of the embodiment, based on the layers and dimensions included in the coding space corresponding to the sample item coding information, the execution body may also input the sample user information of the training sample in the training sample set into the above initial item coding model, so as to obtain the probability distribution of the at least one piece of item coding information corresponding to the input sample user information. The above at least one piece of item coding information typically includes the sample item coding information corresponding to the input sample user information. The probability in the above probability distribution may be obtained based on a sub-probability output by each layer of the coding space. The sub-probability may be obtained based on the sample user information and a feature vector output by a previous layer.

Figure 2C:
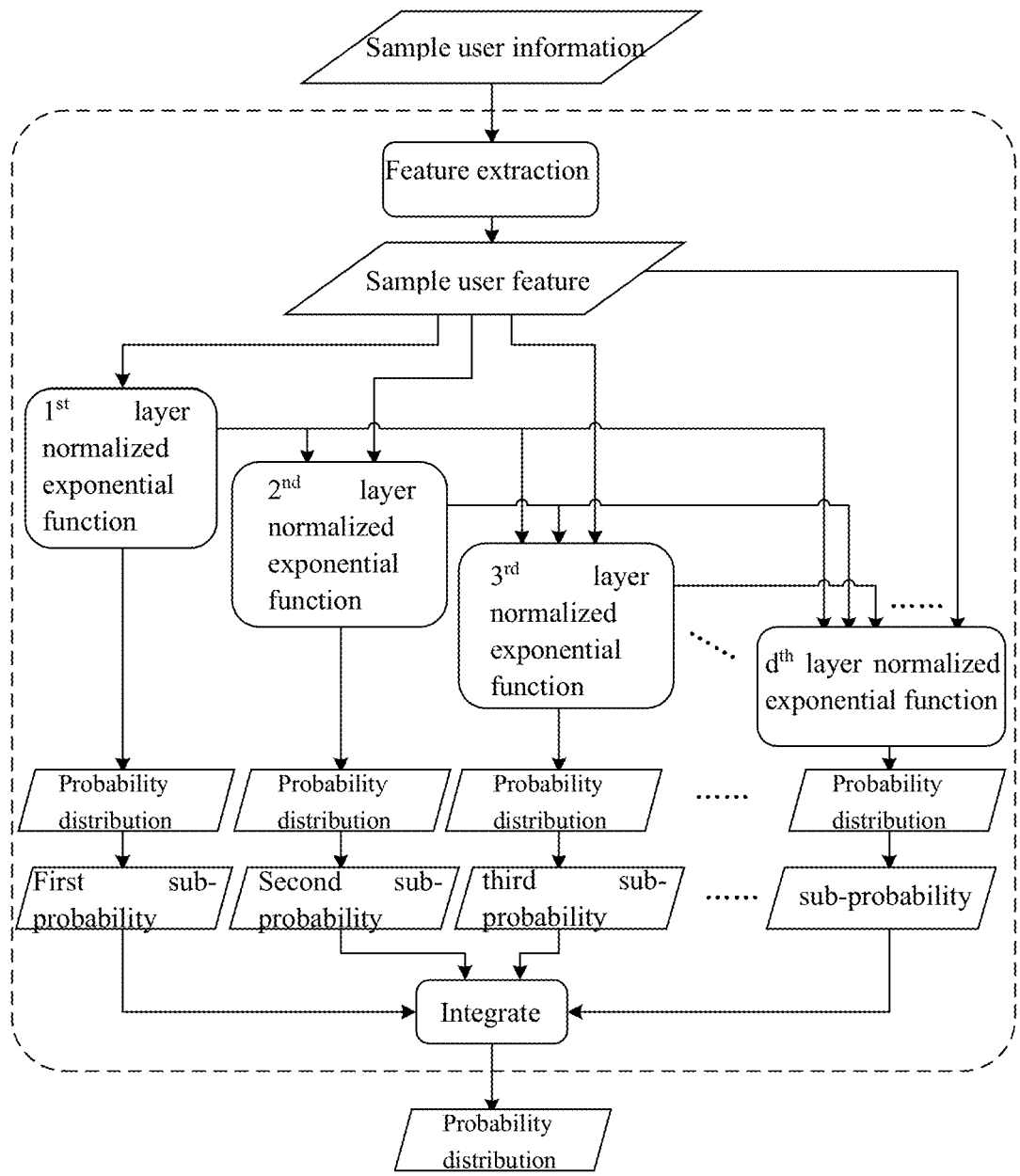
FIG. 2*c* is a schematic flow diagram of determining a probability distribution in an embodiment of a method for training an item coding model according to the present application.

As an example, referring to FIG. 2c, by using the initial item coding model, the execution body may determine a probability distribution corresponding to each dimension in the first layer according to the sample user information, and then may use a probability corresponding to a dimension consistent with a dimension (for example, 36) in the first layer in the sample item coding information as a first sub-probability. Afterwards, the execution body may determine a probability distribution corresponding to each dimension in the second layer according to the sample user information and a feature vector for generating a probability distribution corresponding to each dimension. Then, the execution body may use a probability corresponding to a dimension consistent with a dimension (for example, 27) in the second layer in the sample item coding information as a second sub-probability. Next, the execution body may determine a probability distribution corresponding to each dimension in the third layer according to the sample user information and feature vectors for generating the first sub-probability and the second sub-probability, and then the execution body may use a probability corresponding to a dimension consistent with a dimension (for example, 20) in the third layer in the sample item coding information as a third sub-probability. Finally, the execution body may determine an integration result (for example, a continued product) of the first sub-probability, the second sub-probability and the third sub-probability as the probability of the sample item coding information corresponding to the input sample user information. According to the probability distributions output by the layers, and by using the same manner as the aforesaid method for generating the probability of the sample item coding information, the execution body may generate the probability distribution of the at least one piece of item coding information corresponding to the input sample user information.

Based on the above optional implementations, the execution body may make full use of information transmission between layers in the coding space, so that the model learns the relevance between the generated item coding information, the coding effect is improved, and a technical foundation is provided for high-efficiency retrieval. In the meantime, the cost of manual classification is significantly lowered and the efficiency is improved.

Step 204, a structural parameter of the initial item coding model is adjusted on the basis of maximizing the obtained probability of the sample item coding information corresponding to the input sample user information, so as to obtain the item coding model by training.

In the embodiment, on the basis of maximizing the obtained probability of the sample item coding information corresponding to the input sample user information, the execution body may adjust the structural parameter of the initial item coding model in various manners, so as to obtain the item coding model by training. The item coding model may be used to represent a correspondence relationship between the input sample user information and the sample item coding information as well as a correspondence relationship between the sample item information and the sample item coding information. As an example, the execution body may adjust the structural parameter of the initial item coding model according to a trained loss function. The loss function may, for example, include a negative logarithm of the probability of the sample item coding information corresponding to the input sample user information, so the execution body may adjust the structural parameter of the initial item coding model through various suitable machine learning algorithms to maximize the obtained probability of the sample item coding information corresponding to the input sample user information.

In some optional implementations of the embodiment, the execution body may further continue to execute the following steps:

First step, a relevance degree between each piece of sample item information and each piece of item coding information output by the initial item coding model is determined in a process of adjusting the structural parameter of the initial item coding model.

In these implementations, the relevance degree may be determined based on a probability of at least one piece of item coding information obtained from the input sample user information corresponding to the sample item information through the initial item coding model. As an example, for each training sample (for example, a training sample A, a training sample B and a training sample C) in each batch of training samples in the training sample set, the execution body may obtain the probability of the at least one piece of item coding information corresponding to the sample user information of each training sample output by the initial item coding model. The training sample A may include sample user information x1 and sample item information y1. The training sample B may include sample user information x2 and sample item information y2. The training sample C may include sample user information x3 and sample item information y3. For example, a probability of item coding information corresponding to the training sample A being 009, 015 and 108 may be 0.7, 0.2 and 0.1 respectively. A probability of item coding information corresponding to the training sample B being 009, 015 and 108 may be 0.3, 0.1 and 0.6 respectively. A probability of item coding information corresponding to the training sample C being 009, 015 and 108 may be 0.8, 0.1 and 0.1 respectively. According to the obtained probability of the at least one piece of item coding information corresponding to the sample user information in each training sample, the execution body may determine the relevance degree between each piece of sample item information and each piece of item coding information in various manners, for example, taking a maximum value, a minimum value, an average value, etc. As an example, the execution body may determine the relevance degrees between the sample item information y1 and the item coding information being 009, 015 and 108 to be 0.75, 0.15 and 0.1 respectively, and may determine the relevance degrees between the sample item information y2 and the item coding information being 009, 015 and 108 to be 0.3, 0.1 and 0.6 respectively.

It can be understood that a plurality of batches of training samples are usually used in the process of adjusting the structural parameter of the initial item coding model, so the execution body may determine the relevance degree between each piece of sample item information and each piece of item coding information according to the obtained probability of the at least one piece of item coding information corresponding to each batch of training samples.

Optionally, the execution body may determine the relevance degree between each piece of sample item information and each piece of item coding information according to the following steps:

S1, probabilities between sample item information in each batch of training samples and corresponding item coding information are sequentially determined according to a time order as sub-relevance degrees.

In these implementations, the execution body may sequentially determine the probabilities between sample item information in each batch of training samples and corresponding item coding information according to the time order as the sub-relevance degrees. A manner of determining the sub-relevance degrees may be consistent with relevant description of the aforesaid first step, and repeated description is omitted here.

S2, the determined sub-relevance degrees are integrated to generate the relevance degree between each piece of sample item information and each piece of item coding information.

In these implementations, the execution body may integrate the determined sub-relevance degrees in various manners so as to generate the relevance degree between each piece of sample item information and each piece of item coding information. A proportion of the sub-relevance degrees to the relevance degree is typically consistent with a proximity degree of a training moment to a current moment. That is, the proportion of a sub-relevance degree corresponding to a recently trained sample to the relevance degree is relatively larger. As an example, the above integration method may include but is not limited to a preset weight weighting method, an exponential moving average method, etc.

As an example, another batch of training sample D, training sample E and training sample F trained after the training sample A, the training sample B and the training sample C may respectively include sample user information x1 and sample item information y2, sample user information x3 and sample item information y1, and sample user information x2 and sample item information y3. Probabilities of item coding information corresponding to the training sample D, the training sample E and the training sample F being 009, 015 and 108 may be 0.2, 0.2 and 0.6, 0.7, 0.1 and 0.2, and 0.3, 0.2 and 0.5, respectively. The execution body may determine the sub-relevance degrees between the sample item information y1 in the batch of training samples, namely the training sample D, the training sample E and the training sample F, and the item coding information being 009, 015 and 108 to be 0.7, 0.1 and 0.2 respectively. On the basis that the sub-relevance degrees between the sample item information y1 in the batch of training samples, namely the training sample A, the training sample B and the training sample C, and the item coding information being 009, 015 and 108 are determined by the execution body to be 0.75, 0.15 and 0.1 respectively, the execution body may determine the relevance degrees (weighted by 0.4 and 0.6) between the sample item information y2 and the item coding information being 009, 015 and 108 to be 0.72, 0.12 and 0.16 respectively. The relevance degree between the sample item information y2 and the item coding information being 009 may be obtained through 0.75*0.4+0.7*0.6=0.72.

Based on the above optional implementations, because the batches of training samples may belong to the same epoch, or may belong to different epochs, under a scene of "streaming" samples with samples trained in each epoch being not completely the same, assigning greater weight to results obtained by latest samples participating in training meets timeliness requirements of online learning and applications, which is conducive to improving generalization of the trained model.

Second step, the correspondence relationship between the sample item information and the sample item coding information is adjusted based on the determined relevance degree.

In these implementations, based on the determined relevance degree, the execution body may adjust the correspondence relationship between the sample item information and the sample item coding information, so that the adjusted correspondence relationship between the sample item information and the sample item coding information is consistent with the relevance degree generated in the above first step. As an example, relevance degrees (weighted by 0.4 and 0.6) between the above sample item information y2 and the item coding information being 009, 015 and 108 are determined to be 0.72, 0.12 and 0.16 respectively. If the original sample item coding information corresponding to the sample item information y2 is not "009", the execution body may adjust the sample item coding information corresponding to the sample item information y2 to be the item coding information "009" with the largest relevance degree.

Optionally, the execution body may also store the adjusted correspondence relationship between the sample item information and the sample item coding information. Therefore, after several epochs of item coding model training and alternative adjustments of the correspondence relationship, a trained item coding model and an adjusted correspondence relationship between the sample item information and the sample item coding information may be obtained.

Based on the above optional implementations, the above execution body may adjust the correspondence relationship between the sample item information and the sample item coding information, so as to optimize mapping relationships between the sample item information and the item coding information, thereby increasing the retrieval efficiency.

Optionally, based on a preset penalty function, the execution body may adjust the correspondence relationship between the sample item information and the sample item coding information according to a distribution consistent with the determined relevance degree. The penalty function is in positive correlation with a number of sample items corresponding to the item coding information. For example, the penalty function may be directly proportional to the square of the number of the sample items corresponding to the item coding information.

Based on the above optional implementations, the situation that a single piece of sample item coding information corresponds to excessive sample item information may be avoided through the penalty function, which is conducive to mitigating service end pressure in a model application process.

Optionally, the sample item information may correspond to a priority. Based on the corresponding priority, the execution body may adjust the correspondence relationship between the sample item information and the sample item coding information according to the following steps:

S1, in response to determining that a number corresponding to the same piece of item coding information is larger than a preset threshold, sample item information of a target number is selected from the sample item information corresponding to the same piece of item coding information according to the corresponding priority.

In these implementations, in response to determining that the number corresponding to the same piece of item coding information is larger than the preset threshold, the execution body may select the sample item information of the target number from the sample item information corresponding to the same piece of item coding information according to the corresponding priority. As an example, assuming that the item coding information matching the maximum relevance degree corresponding to the sample item information y2, y5, y8 and y9 is 009, and that the preset threshold is, for example, 3, the execution body may select sample item information with the lowest priority from the sample item information y2, y5, y8 and y9. Optionally, the execution body may also select sample item information with a priority lower than a preset priority threshold from the sample item information y2, y5, y8 and y9, such as y2 and y5. Afterwards, the execution body may randomly select the sample item information of the target number from the sample item information with the priority lower than the preset priority threshold.

S2, sample item coding information corresponding to the selected sample item information of the target number is re-generated according to the determined relevance degree.

In these implementations, the execution body may use the sample item information of the target number selected in above step S1 to re-generate the sample item coding information consistent with the determined sub-relevance degrees. As an example, the execution body may determine item coding information corresponding to a second highest relevance degree corresponding to the selected sample item information as the sample item coding information corresponding to the sample item information.

Figure 3:
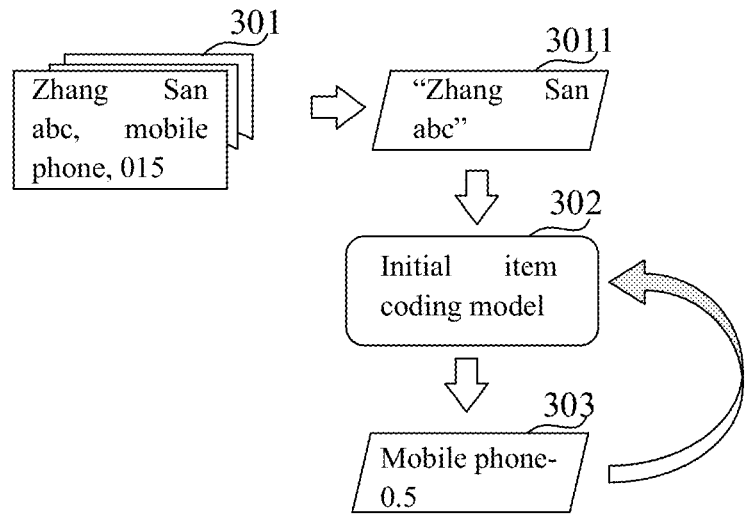
FIG. 3 is a schematic diagram of an application scene of a method for training an item coding model according to an embodiment of the present application.

Continuing referring to FIG. 3, FIG. 3 is a schematic diagram of an application scene of a method for training an item coding model according to an embodiment of the present application. In the application scene in FIG. 3, a back-end server may obtain a training sample set 301 and an initial item coding model 302. The training sample set may include "Zhang San abc" as sample user information, "mobile phone" as sample item information, and "015" as sample item coding information. The back-end server may input "Zhang San abc" 3011 in a training sample into the initial item coding model 302 to obtain a probability corresponding to "mobile phone", for example, 0.5 (as shown by 303 in FIG. 3). The back-end server may adjust a model parameter of the initial item coding model 302 through various algorithms (for example, an EM algorithm), so as to maximize the probability of "mobile phone" corresponding to output of "Zhang San abc" 3011 in the training sample. Therefore, the trained initial item coding model 302 is determined as a trained item coding model.

Currently, one of existing technologies is to map to-be-recalled information to a vector space, and recall nearest information by using algorithms such as ANN (Approximate Nearest Neighbor). Due to limitation of the size of the vector space and a used distance (generally inner product/Euclidean distance or cosine distance), the ability of the model cannot be fully utilized; and because a vector mapping model is relatively independent of a structure constructed by ANN, information of the ANN structure cannot be utilized for combined training in model training. In addition, a deep tree structure in the prior art is highly discretized, leading to difficult joint learning of structural features of a tree and the model parameter. According to the method provided by the embodiment of the present application, by introducing the item coding information as an intermediate variable between the user information and the item information, the item coding model for representing the correspondence relationship between the input sample user information and the sample item coding information as well as the correspondence relationship between the sample item information and the sample item coding information is obtained by training. Therefore, the item coding model may represent the correspondence relationship between the user information and the item information for item recommendation, and may also use the item coding information as an index to improve the retrieval efficiency. Further, overall training of the model is realized.

Figure 4:
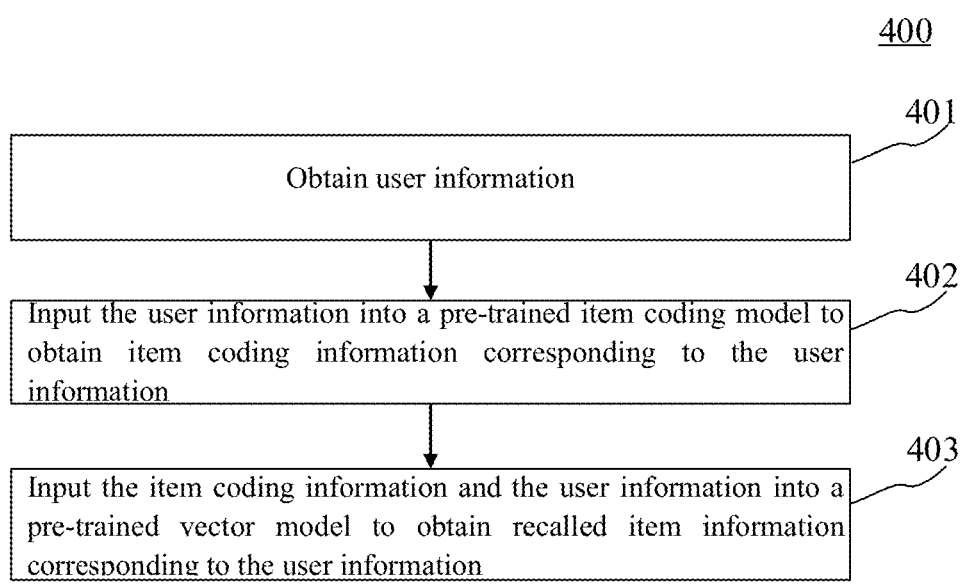
FIG. 4 is a flow chart of an embodiment of a method for generating recalled item information according to the present application.

Further referring to FIG. 4, a flow chart 400 of an embodiment of a method for generating recalled item information is illustrated. The flow chart 400 of the method for generating the recalled item information includes the following steps:

Step 401, user information is obtained.

In the embodiment, an execution body (for example, a server 105 shown in FIG. 1) of the method for generating the recalled item information may obtain the user information in a manner of wired connection or a manner of wireless connection. The user information may include various information related to a user, such as a user name, a user label, etc. The user information may also include historical click information of the user. The historical click information may include but is not limited to at least one of the following: commodity information, article, video, and music.

Step 402, the user information is input into a pre-trained item coding model to obtain item coding information corresponding to the user information.

In the embodiment, the execution body may input the user information obtained in step 401 into the pre-trained item coding model to obtain the item coding information corresponding to the user information. The item coding model may be obtained by training through the method according to the aforesaid embodiment and optional implementations thereof.

Step 403, the item coding information and the user information are input into a pre-trained vector model to obtain recalled item information corresponding to the user information.

In the embodiment, the execution body may input the item coding information obtained in step 402 and the user information obtained in step 401 into the pre-trained vector model, so as to obtain the recalled item information corresponding to the user information. The vector model may include various machine learning models for recall, such as a network structure obtained by integrating an FFM (Field-aware Factorization Machine) model and/or DNNs (Deep Neural Networks).

In some optional implementations of the embodiment, the item coding model and the vector model are usually trained together based on a feature vector corresponding to the item coding information.

Based on the above optional implementations, the feature vector corresponding to the item coding information is used as an intermediate carrier for the item coding model and the vector model to realize joint training, so association between the two models is closer, and therefore a matching degree of the generated recalled item information is increased.

It can be seen from FIG. 4 that, the flow chart 400 of the method for generating the recalled item information in the embodiment embodies a step that output of the item coding model is used as a newly added dimension to be input into the vector model so as to obtain the recalled item information corresponding to the user information. In this way, the solution described in the embodiment may not only use the user information, but also use the generated item coding information to generate the recalled item information, so the matching degree of the generated recalled item information is increased.

Figure 5:
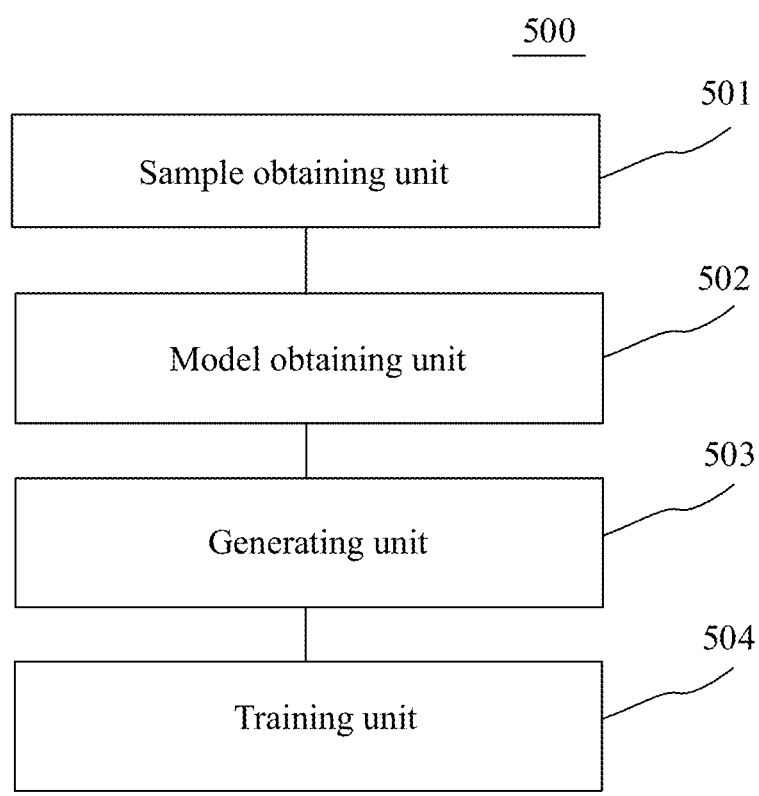
FIG. 5 is a schematic structural diagram of an embodiment of an apparatus for training an item coding model according to the present application.

Further referring to FIG. 5, as implementation of the method shown in the drawings, the present application provides an embodiment of an apparatus for training an item coding model.

The apparatus embodiment corresponds to the method embodiment shown in FIG. 2, and the apparatus may specifically be applied to various electronic devices.

As shown in FIG. 5, the apparatus 500 for training the item coding model provided by the embodiment includes a sample obtaining unit 501, a model obtaining unit 502, a generating unit 503 and a training unit 504. The sample obtaining unit 501 is configured to obtain a training sample set. A training sample in the training sample set includes sample user information, sample item information corresponding to the sample user information, and sample item coding information corresponding to the corresponding sample item information. The model obtaining unit 502 is configured to obtain an initial item coding model. The generating unit 503 is configured to use the sample user information of the training sample in the training sample set as input into the initial item coding model to obtain a probability of the sample item coding information corresponding to the input sample user information. The training unit 504 is configured to adjust a structural parameter of the initial item coding model on the basis of maximizing the obtained probability of the sample item coding information corresponding to the input sample user information, so as to obtain the item coding model by training. The item coding model is used to represent a correspondence relationship between the input sample user information and the sample item coding information as well as a correspondence relationship between the sample item information and the sample item coding information.

In the embodiment, in the apparatus 500 for training the item coding model: specific processing of the sample obtaining unit 501, the model obtaining unit 502, the generating unit 503 and the training unit 504 as well as technical effects brought thereby may refer to relevant descriptions of step 201, step 202, step 203 and step 204 in the corresponding embodiment in FIG. 2, and repeated description is omitted here.

In some optional implementations of the embodiment, the above sample obtaining unit 501 may include an obtaining module (not shown in the figure), a first generating module (not shown in the figure), and a combining module (not shown in the figure). The obtaining module may be configured to obtain an initial training sample set. An initial training sample in the initial training sample set may include sample user information and sample item information corresponding to the sample user information. The first generating module may be configured to randomly generate sample item coding information corresponding to the initial training sample in the initial training sample set. The combining module may be configured to combine the initial training sample and the randomly generated sample item coding information into the training sample in the training sample set.

In some optional implementations of the embodiment, the apparatus 500 for training the item coding model may further include a determining unit (not shown in the figure), and an adjusting unit (not shown in the figure). The determining unit may be configured to determine a relevance degree between each piece of sample item information and each piece of item coding information output by the initial item coding model in a process of adjusting the structural parameter of the initial item coding model. The relevance degree is determined based on a probability of at least one piece of item coding information obtained from the input sample user information corresponding to the sample item information through the initial item coding model. The adjusting unit may be configured to adjust the correspondence relationship between the sample item information and the sample item coding information based on the determined relevance degree.

In some optional implementations of the embodiment, the determining unit may include a determining module (not shown in the figure) and an integrating module (not shown in the figure). Specifically, the determining module may be configured to sequentially determine probabilities between sample item information in each batch of training samples and corresponding item coding information according to a time order as sub-relevance degrees. The integrating module may be configured to integrate the determined sub-relevance degrees to generate the relevance degree between each piece of sample item information and each piece of item coding information. A proportion of the sub-relevance degrees to the relevance degree is consistent with a proximity degree of a training moment to a current moment.

In some optional implementations of the embodiment, the adjusting unit may be further configured to: adjust the correspondence relationship between the sample item information and the sample item coding information according to a distribution consistent with the determined relevance degree and based on a preset penalty function. The penalty function is in positive correlation with a number of sample items corresponding to the item coding information.

In some optional implementations of the embodiment, the sample item information corresponds to a priority. The adjusting unit may include a selecting module (not shown in the figure) and a second generating module (not shown in the figure). The selecting module may be configured to select sample item information of a target number from the sample item information corresponding to the same piece of item coding information according to the corresponding priority in response to determining that a number corresponding to a same piece of item coding information is larger than a preset threshold. The second generating module may be configured to re-generate sample item coding information corresponding to the selected sample item information of the target number according to the determined relevance degree.

In some optional implementations of the embodiment, a coding space corresponding to the sample item coding information includes layers of a first number, each layer in the layers of the first number includes dimensions of a second number, and the first number is smaller than the second number.

In some optional implementations of the embodiment, the generating unit 503 may be further configured to: input the sample user information of the training sample in the training sample set into the initial item coding model to obtain a probability distribution of at least one piece of item coding information corresponding to the input sample user information. The at least one piece of item coding information may include the sample item coding information corresponding to the input sample user information, a probability in the probability distribution may be obtained based on a sub-probability output by each layer in the coding space, and the sub-probability may be obtained based on the sample user information and a feature vector output by a previous layer.

According to the apparatus provided by the above embodiment of the present application, the training sample set is obtained through the sample obtaining unit 501. The training sample in the training sample set includes the sample user information, the sample item information corresponding to the sample user information, and the sample item coding information corresponding to the corresponding sample item information. Then, the module obtaining unit 502 obtains the initial item coding model. Afterwards, the generating unit 503 uses the sample user information of the training sample in the training sample set as the input into the initial item coding model to obtain the probability of the sample item coding information corresponding to the input sample user information. Finally, the training unit 504 adjusts the structural parameter of the initial item coding model on the basis of maximizing the obtained probability of the sample item coding information corresponding to the input sample user information, so as to obtain the item coding model by training. The item coding model is used to represent the correspondence relationship between the input sample user information and the sample item coding information as well as the correspondence relationship between the sample item information and the sample item coding information. Therefore, item recommendation may be realized by using the trained item coding model, and the item coding information may be used as indexes to improve the retrieval efficiency.

Figure 6:
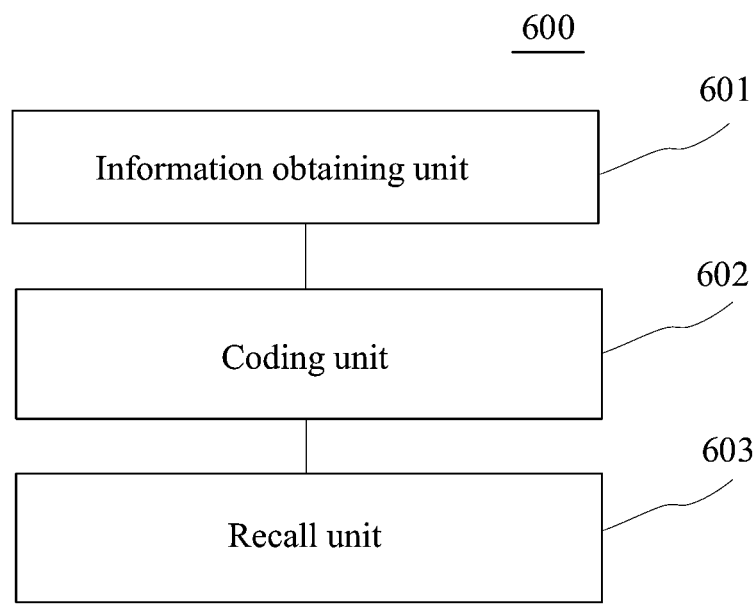
FIG. 6 is a schematic structural diagram of an embodiment of an apparatus for generating recalled item information according to the present application.

Further referring to FIG. 6, as implementation of the method shown in the drawings, the present application provides an embodiment of an apparatus for generating recalled item information. The apparatus embodiment corresponds to the method embodiment shown in FIG. 4, and the apparatus may specifically be applied to various electronic devices.

As shown in FIG. 6, the apparatus 600 for generating the recalled item information provided by the embodiment includes an information obtaining unit 601, a coding unit 602 and a recall unit 603. The information obtaining unit 601 is configured to obtain user information; the coding unit 602 is configured to input the user information into a pre-trained item coding model to obtain item coding information corresponding to the user information, and the item coding model is obtained by training through the aforesaid method for training the item coding model; and the recall unit 603 is configured to input the item coding information and the user information into a pre-trained vector model to obtain recalled item information corresponding to the user information.

In the embodiment, in the apparatus 600 for generating the recalled item information: specific processing of the information obtaining unit 601, the coding unit 602 and the recall unit 603 as well as technical effects brought thereby may refer to relevant descriptions of step 401, step 402, and step 403 as well as optional implementations thereof in the corresponding embodiment in FIG. 4, and repeated description is omitted here.

In some optional implementations of the embodiment, the item coding model and the vector model may be trained together based on a feature vector corresponding to the item coding information.

According to the apparatus provided by the above embodiment of the present application, the user information is first obtained through the information obtaining unit 601. Then the coding unit 602 inputs the user information into the pre-trained item coding model to obtain the item coding information corresponding to the user information, and the item coding model is obtained by training through the aforesaid method for training the item coding model. The recall unit 603 inputs the item coding information and the user information into the pre-trained vector model to obtain recalled item information corresponding to the user information. Therefore, not only the user information, but also the generated item coding information may be used to generate the recalled item information, so the matching degree of the generated recalled item information is increased.

Figure 7:
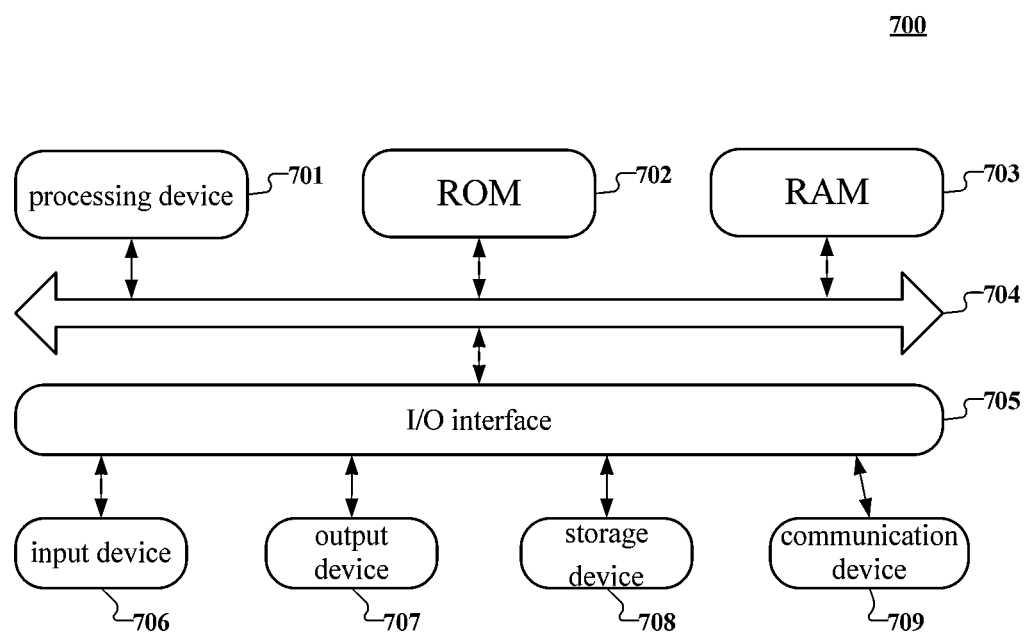
FIG. 7 is a schematic structural diagram of an electronic device suitable for implementing an embodiment of the present application.

Referring next to FIG. 7, it shows a schematic structural diagram of an electronic device (eg, the server in FIG. 1) 700 suitable for implementing an embodiment of the present application. Terminal devices in the embodiments of the present application may include, but are not limited to, mobile terminals such as mobile phones, notebook computers, digital broadcast receivers, PDAs (personal digital assistants), PADs (tablets), PMPs (portable multimedia players), vehicle-mounted terminals (for example, in-vehicle navigation terminals), etc., and stationary terminals such as digital TVs, desktop computers, and the like. The server shown in FIG. 7 is only an example, and should not impose any limitations on the functions and scope of use of the embodiments of the present application.

As shown in FIG. 7, an electronic device 700 may include a processing device (eg, a central processing unit, a graphics processor, etc.) 701 that may execute various appropriate actions and processes according to a program stored in a read only memory (ROM) 702 or a program be loaded into random access memory (RAM) 703 from a storage device 708. In the RAM 703, various programs and data necessary for the operation of the electronic device 700 are also stored. The processing device 701, the ROM 702, and the RAM 703 are connected to each other through a bus 704. An input/output (I/O) interface 705 is also connected to the bus 704.

Typically, the following devices may be connected to the I/O interface 705: an input device 706 including, for example, a touch screen, touch pad, keyboard, mouse, camera, microphone, accelerometer, gyroscope, etc.; an output device 707 including, for example, a Liquid Crystal Display (LCD), speaker, vibrator, etc.; a storage device 708, including, for example, magnetic tape, hard disk, etc.; and a communication device 709. The communication device 709 may allow electronic device 700 to communicate wirelessly or by wire with other devices to exchange data. Although FIG. 7 shows an electronic device 700 having various devices, it should be understood that not all of the illustrated devices are required to be implemented or provided. More or fewer devices may alternatively be implemented or provided. Each block shown in FIG. 7 can represent one device, and can also represent multiple devices as required.

In particular, according to embodiments of the present application, the processes described above with reference to the flowcharts may be implemented as computer software programs. For example, embodiments of the present application include a computer program product comprising a computer program carried on a computer-readable medium, the computer program contains a program code for performing the method illustrated in the flowchart. In such an embodiment, the computer program may be downloaded and installed from the network via the communication device 709, or from the storage device 708, or from the ROM 702. When the computer program is executed by the processing device 701, the above-mentioned functions defined in the methods of the embodiments of the present application are executed.

It should be noted that the computer-readable medium described in the embodiments of the present application may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus or device, or a combination of thereof. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In the embodiments of the present application, a computer-readable storage medium may be any tangible medium that contains or stores a program that can be used by or in conjunction with an instruction execution system, apparatus, or device. While in embodiments of the present application, a computer-readable signal medium may include a data signal in baseband or propagated as part of a carrier wave, carrying computer-readable program code therein. Such propagated data signals may take a variety of forms, including but not limited to electromagnetic signals, optical signals, or any suitable combination thereof. A computer-readable signal medium can also be any computer-readable medium other than a computer-readable storage medium, the computer-readable signal medium can transmit, propagate, or transport the program for use by or in connection with the instruction execution system, apparatus, or device. The program code contained on the computer-readable medium can be transmitted by any suitable medium, including but not limited to: electric wire, optical cable, RF (Radio Frequency, radio frequency), etc., or any suitable combination thereof.

The above-mentioned computer-readable medium may be included in the above-mentioned server; or may exist alone without being assembled into the server. The above-mentioned computer-readable medium carries one or more programs, and when the above-mentioned one or more programs are executed by the server, causes the server to: obtain a training sample set, wherein the training samples in the training sample set include sample user information, sample item information corresponding to the sample user information and the sample item coding information corresponding to the corresponding sample item information; obtain the initial item coding model; use the sample user information of the training samples in the training sample set as the input into the initial item coding model, to obtain the probability of the sample item coding information corresponding to the input sample user information; adjust the structural parameters of the initial item coding model based on maximizing the obtained probability of the sample item coding information corresponding to the input sample user information, to obtain the item coding model by training, wherein the item coding model is used to represent the correspondence relationship between the input sample user information and the sample item coding information and the correspondence relationship between the sample item information and the sample item coding information.

Computer program code for performing the operations of the embodiments of the present application may be written in one or more programming languages, including object-oriented programming languages—such as Java, Smalltalk, C++, and including conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (eg, using an Internet service provider via Internet connection).

The flowchart and block diagrams in the Figures illustrate the architecture, functionality, and operation of possible implementations of systems, methods and computer program products according to various embodiments of the present application. In this regard, each block in the flowchart or block diagrams may represent a module, program segment, or portion of code that contains one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart, and combinations of blocks in the block diagrams and/or flowchart, can be implemented in dedicated hardware-based systems that perform the specified functions or operations, or can be implemented in a combination of dedicated hardware and computer instructions.

The units involved in the embodiments of the present application may be implemented in a software manner, and may also be implemented in a hardware manner. The described unit can also be provided in the processor, for example, it can be described as: a processor including a sample obtaining unit, a model obtaining unit, a generation unit, and a training unit. The names of these units do not constitute a limitation of the unit itself under certain circumstances, for example, the model obtaining unit may also be described as "a unit for obtaining an initial item encoding model".

The above description is only a preferred embodiment of the present application and an illustration of the applied technical principles. It should be understood by those skilled in the art that the scope of the application involved in the embodiments of the present application is not limited to the technical solution formed by the specific combination of the above technical features, and should also cover, without departing from the above inventive concept, the above other technical solutions formed by any combination of technical features or their equivalent features. For example, a technical solution is formed by replacing the above features with the technical features disclosed in the embodiments of the present application (but not limited to) with similar functions.

What is claimed is:

1. A method for training an item coding model, comprising:
    obtaining a training sample set, wherein a training sample in the training sample set comprises sample user information, sample item information corresponding to the sample user information, and sample item coding information corresponding to the corresponding sample item information;
    obtaining an initial item coding model;
    using the sample user information of the training sample in the training sample set as input into the initial item coding model to obtain a probability of the sample item coding information corresponding to the input sample user information;
    adjusting a structural parameter of the initial item coding model on the basis of maximizing the obtained probability of the sample item coding information corresponding to the input sample user information, so as to obtain the item coding model by training, wherein the item coding model is used to represent a correspondence relationship between the input sample user information and the sample item coding information as well as a correspondence relationship between the sample item information and the sample item coding information;
    determining a relevance degree between each piece of sample item information and each piece of item coding information output by the initial item coding model in a process of adjusting the structural parameter of the initial item coding model, wherein the relevance degree is determined based on a probability of at least one piece of item coding information obtained from the input sample user information corresponding to the sample item information through the initial item coding model, wherein determining the relevance degree between each piece of sample item information and each piece of item coding information output by the initial item coding model in the process of adjusting the structural parameter of the initial item coding model comprises:
        determining probabilities between the sample item information in each batch of training samples and the corresponding item coding information sequentially according to a time order as sub-relevance degrees; and
        integrating the determined sub-relevance degrees to generate the relevance degree between each piece of sample item information and each piece of item coding information, wherein a proportion of the sub-relevance degrees to the relevance degree is consistent with a proximity degree of a training moment to a current moment; and
    adjusting the correspondence relationship between the sample item information and the sample item coding information based on the determined relevance degree.

2. The method according to claim 1, wherein obtaining the training sample set comprises:
    obtaining an initial training sample set, wherein an initial training sample in the initial training sample set comprises the sample user information and the sample item information corresponding to the sample user information;
    randomly generating the sample item coding information corresponding to the initial training sample in the initial training sample set; and
    combining the initial training sample and the randomly generated sample item coding information into the training sample in the training sample set.

3. The method according to claim 2, wherein a coding space corresponding to the sample item coding information comprises layers of a first number, each layer in the layers of the first number comprises dimensions of a second number, and the first number is smaller than the second number.

4. The method according to claim 1, wherein adjusting the correspondence relationship between the sample item information and the sample item coding information based on the determined relevance degree comprises:
    adjusting the correspondence relationship between the sample item information and the sample item coding information according to a distribution consistent with the determined relevance degree and based on a preset penalty function, wherein the penalty function is in positive correlation with a number of sample items corresponding to the item coding information.

5. The method according to claim 4, wherein the sample item information corresponds to a priority, and
    adjusting the correspondence relationship between the sample item information and the sample item coding information according to the distribution consistent with the determined relevance degree and based on the preset penalty function comprises:

selecting, in response to determining that a number corresponding to the same piece of item coding information is larger than a preset threshold, sample item information of a target number from the sample item information corresponding to the same piece of item coding information according to the corresponding priority; and re-generating sample item coding information corresponding to the selected sample item information of the target number according to the determined relevance degree.

6. The method according to claim 1, wherein a coding space corresponding to the sample item coding information comprises layers of a first number, each layer in the layers of the first number comprises dimensions of a second number, and the first number is smaller than the second number.

7. The method according to claim 6, wherein using the sample user information of the training sample in the training sample set as the input into the initial item coding model to obtain the probability of the sample item coding information corresponding to the input sample user information comprises:

inputting the sample user information of the training sample in the training sample set into the initial item coding model to obtain a probability distribution of at least one piece of item coding information corresponding to the input sample user information, wherein the at least one piece of item coding information comprises the sample item coding information corresponding to the input sample user information, a probability in the probability distribution is obtained based on a sub-probability output by each layer in the coding space, and the sub-probability is obtained based on the sample user information and a feature vector output by a previous layer.

8. A method for generating recalled item information, comprising:

obtaining user information;

inputting the user information into a pre-trained item coding model to obtain item coding information corresponding to the user information, wherein the item coding model is obtained by training through the method according to claim 1; and inputting the item coding information and the user information into a pre-trained vector model to obtain the recalled item information corresponding to the user information.

9. The method according to claim 8, wherein the item coding model and the vector model are trained together based on a feature vector corresponding to the item coding information.

10. A computer-readable storage medium, storing a computer program therein, wherein the program, when being executed by a processor, causes the processor to implement a method comprising:

obtaining a training sample set, wherein a training sample in the training sample set comprises sample user information, sample item information corresponding to the sample user information, and sample item coding information corresponding to the corresponding sample item information;

obtaining an initial item coding model;

using the sample user information of the training sample in the training sample set as input into the initial item coding model to obtain a probability of the sample item coding information corresponding to the input sample user information;

adjusting a structural parameter of the initial item coding model on the basis of maximizing the obtained probability of the sample item coding information corresponding to the input sample user information, so as to obtain the item coding model by training, wherein the item coding model is used to represent a correspondence relationship between the input sample user information and the sample item coding information as well as a correspondence relationship between the sample item information and the sample item coding information;

determining a relevance degree between each piece of sample item information and each piece of item coding information output by the initial item coding model in a process of adjusting the structural parameter of the initial item coding model, wherein the relevance degree is determined based on a probability of at least one piece of item coding information obtained from the input sample user information corresponding to the sample item information through the initial item coding model, wherein determining the relevance degree between each piece of sample item information and each piece of item coding information output by the initial item coding model in the process of adjusting the structural parameter of the initial item coding model comprises:

determining probabilities between the sample item information in each batch of training samples and the corresponding item coding information sequentially according to a time order as sub-relevance degrees; and integrating the determined sub-relevance degrees to generate the relevance degree between each piece of sample item information and each piece of item coding information, wherein a proportion of the sub-relevance degrees to the relevance degree is consistent with a proximity degree of a training moment to a current moment; and adjusting the correspondence relationship between the sample item information and the sample item coding information based on the determined relevance degree.

11. The computer-readable storage medium according to claim 10, wherein obtaining the training sample set comprises:

obtaining an initial training sample set, wherein an initial training sample in the initial training sample set comprises the sample user information and the sample item information corresponding to the sample user information;

randomly generating the sample item coding information corresponding to the initial training sample in the initial training sample set; and combining the initial training sample and the randomly generated sample item coding information into the training sample in the training sample set.

12. The computer-readable storage medium according to claim 11, wherein a coding space corresponding to the sample item coding information comprises layers of a first number, each layer in the layers of the first number comprises dimensions of a second number, and the first number is smaller than the second number.

13. The computer-readable storage medium according to claim 10, wherein adjusting the correspondence relationship between the sample item information and the sample item coding information based on the determined relevance degree comprises:
    adjusting the correspondence relationship between the sample item information and the sample item coding information according to a distribution consistent with the determined relevance degree and based on a preset penalty function, wherein the penalty function is in positive correlation with a number of sample items corresponding to the item coding information.

14. The computer-readable storage medium according to claim 13, wherein the sample item information corresponds to a priority, and
    adjusting the correspondence relationship between the sample item information and the sample item coding information according to the distribution consistent with the determined relevance degree and based on the preset penalty function comprises:
    selecting, in response to determining that a number corresponding to the same piece of item coding information is larger than a preset threshold, sample item information of a target number from the sample item information corresponding to the same piece of item coding information according to the corresponding priority; and
    re-generating sample item coding information corresponding to the selected sample item information of the target number according to the determined relevance degree.

15. The computer-readable storage medium according to claim 10, wherein a coding space corresponding to the sample item coding information comprises layers of a first number, each layer in the layers of the first number comprises dimensions of a second number, and the first number is smaller than the second number.

16. The computer-readable storage medium according to claim 15, wherein using the sample user information of the training sample in the training sample set as the input into the initial item coding model to obtain the probability of the sample item coding information corresponding to the input sample user information comprises:
    inputting the sample user information of the training sample in the training sample set into the initial item coding model to obtain a probability distribution of at least one piece of item coding information corresponding to the input sample user information, wherein the at least one piece of item coding information comprises the sample item coding information corresponding to the input sample user information, a probability in the probability distribution is obtained based on a sub-probability output by each layer in the coding space, and the sub-probability is obtained based on the sample user information and a feature vector output by a previous layer.

* * * * *